UNITED STATES PATENT OFFICE.

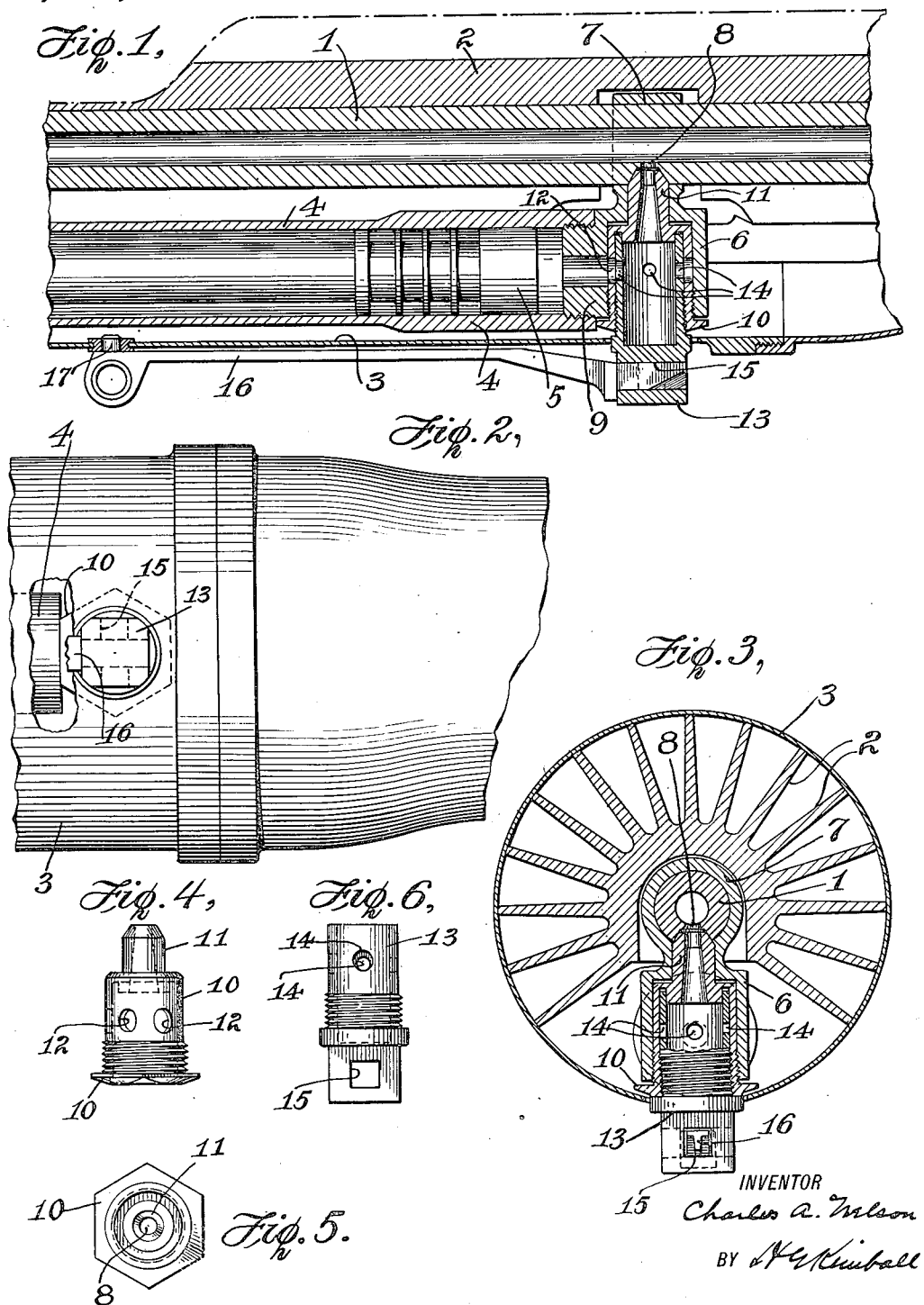

CHARLES A. NELSON, OF UTICA, NEW YORK, ASSIGNOR TO SAVAGE ARMS CORPORATION, A CORPORATION OF DELAWARE.

GAS-OPERATED FIREARM.

1,388,879.  Specification of Letters Patent.  Patented Aug. 30, 1921.

Application filed September 21, 1918. Serial No. 255,058.

*To all whom it may concern:*

Be it known that I, CHARLES A. NELSON, United States citizen, residing in Utica, New York, have invented the following described Improvements in Gas-Operated Firearms.

The invention relates to the connection between the muzzle and gas cylinder in gas operated fire arms and consists in the structure and organization of the several parts and functions as hereinafter described whereby the said connection is stronger and more easily and accurately manufactured and assembled, at the same time providing for the ready adjustment of the gas transmission, and whereby also other advantages are obtained as will be hereinafter made apparent to those skilled in this art.

In the accompanying drawings—

Figure 1 is a longitudinal section through a portion of a gun showing the gas cylinder and adjacent parts including the gas connection constructed according to this invention;

Fig. 2 is a bottom plan of Fig. 1;

Fig. 3 a cross section through the gas connection;

Figs. 4 and 5 are details of the gland; and

Fig. 6 of the regulator cup.

In the drawings the gun barrel is marked 1 and indicated as contained within a ribbed heat radiator 2, the latter being surrounded by a casing 3. The gas cylinder marked 4 is within the casing, being parallel with the gun barrel, and its gas-operated piston 5 is shown in its forward position. It will be understood that the pressure of the muzzle gases transmitted through the connection fittings about to be described, acts upon this piston to effect the various functions of the arm.

The said gas connection comprises two fittings, first a fitting 6 having an interior space which may be termed the gas chamber and a band 7 which encircles and fits snugly over the gun barrel at a point near the muzzle thereof where the vent port 8 is bored in the latter. At its rear side the gas chamber of fitting 6 is formed with a tubular externally-threaded boss 9 which forms the head of the gas cylinder 4 when the latter is screwed thereon. The lower end of the gas chamber is open and internally threaded to receive the second fitting 10 which may be termed the gas gland, the upper or inner end of which is provided with a tubular tapered nipple 11 adapted to protrude from the gas chamber into the vent port 8 which is correspondingly tapered so that when the gland is screwed home in the chamber the nipple seats tightly upon said port making a gastight joint therewith and the pressure thus exerted serves also to bind and clamp the band 7 to the muzzle. Inasmuch as the gas chamber is in one piece with the muzzle band and the gland is confined within it, it will be apparent that the connection is exceptionally rigid and secure so long as the gland is protected from unscrewing. Its internal location, within the gas chamber, is a protection in this respect but further security is provided by making the lower end or screw head of the gland hexagonal or multi-sided and wide enough so that it overlaps the boss 9 whereby the gas cylinder 4 can be screwed up on the boss far enough to engage one of the flat sides of the head or at least close enough to it to prevent unscrewing under the effects of vibration. It should be observed moreover that by virtue of the described arrangement of exterior and interior fittings, the joint-making and clamping pressure is produced by the screw-threaded engagement of parts of relatively large diameter and ample section permitting the use of adequately fine threads with a maximum strength.

The gas gland fitting 10 is hollow and provided with a number of apertures 12, one of which is always in registry with the hole through the boss 9 when a flat side of the hexagonal head is engaged by the gas cylinder 4 thus providing a gas flow passage from the port 8 to the gas cylinder. The regulating cup 13 is screwed into the open end of the gland fitting so that its upper or inner end occupies an annular groove in the upper part of the gland. Its cylindrical wall is provided with a series of ports 14 of graded diameter, any one of which can be brought into registry with the ports leading through the gland and boss 9 for restricting or regulating the gas flow accordingly. The lower end or head of the cup 13 is provided with cross slots 15 to receive the tool by which the cup can be turned in the gland to accomplish this adjustment. The tool—a gun screw-driver—is normally held by one of the cross slots with its flexible handle 16 formed with a stud 17 engaged in a hole on the underside of the casing 3, from which it may readily be removed to regulate the gas cup or for use elsewhere.

The foregoing description of the preferred form of this invention will sufficiently illustrate the principle thereof and it will be apparent that the same can be embodied in various forms and applied in various ways to secure the practical advantages of the structure shown and especially the advantage of the large diameter threads for securing the band to the barrel and forming the gas-tight joint therewith.

Claims:

1. In gas operated fire arms, a gas connection between the muzzle and gas cylinder including two fittings one of which is connected to the cylinder and encircles the muzzle and the other of which in itself forms a gas-tight connection between the first fitting and the muzzle.

2. The gas connection of claim 1 in which the second fitting is screw threaded into a part of relatively wide diameter of the first fitting.

3. The gas connection of claim 1 in which the first fitting includes a gas chamber and the second is contained within said chamber.

4. The gas connection of claim 1 in which the second fitting has a screw head locked against unscrewing by engagement with the gas cylinder.

5. In a gas operated fire arm, a gas connection between the muzzle and gas cylinder comprising a one-piece muzzle band and gas chamber and a screw-threaded gland member within the gas chamber forming a gas-tight connection with the muzzle and clamping the band thereto.

6. In a gas operated fire arm, a gas connection between the muzzle and gas cylinder comprising a one-piece muzzle band and gas chamber, a gas gland therein and a regulator cup within the gas gland.

In testimony whereof, I have signed this specification.

CHARLES A. NELSON.